(12) United States Patent
Yamamoto et al.

(10) Patent No.: US 8,993,114 B2
(45) Date of Patent: Mar. 31, 2015

(54) HARD COAT FILM, POLARIZER AND IMAGE DISPLAY DEVICE

(75) Inventors: Kana Yamamoto, Tokyo (JP); Toshiki Iwasaki, Tokyo (JP); Masayuki Tsunekawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 12 days.

(21) Appl. No.: 13/996,899

(22) PCT Filed: Dec. 16, 2011

(86) PCT No.: PCT/JP2011/079230
§ 371 (c)(1),
(2), (4) Date: Jul. 26, 2013

(87) PCT Pub. No.: WO2012/086551
PCT Pub. Date: Jun. 28, 2012

(65) Prior Publication Data
US 2013/0295390 A1 Nov. 7, 2013

(30) Foreign Application Priority Data
Dec. 24, 2010 (JP) .................. 2010-288561

(51) Int. Cl.
| | | |
|---|---|---|
| *G02B 1/10* | (2006.01) |
| *C08G 18/67* | (2006.01) |
| *C08G 18/10* | (2006.01) |
| *C09D 175/16* | (2006.01) |
| *C08L 75/16* | (2006.01) |
| *C08F 290/06* | (2006.01) |
| *C08J 7/04* | (2006.01) |

(Continued)

(52) U.S. Cl.
CPC . *G02B 1/105* (2013.01); *G02B 5/30* (2013.01); *G02F 1/133528* (2013.01); *G02F 2201/50* (2013.01); *C08G 18/672* (2013.01); *C08G 18/673* (2013.01); *C08G 18/10* (2013.01); *C09D 175/16* (2013.01); *C08L 75/16* (2013.01); *C08F 290/067* (2013.01); *C09D 4/06* (2013.01); *C08J 7/047* (2013.01); *C08J 7/08* (2013.01); *C08J 2301/02* (2013.01); *C08J 2475/04* (2013.01); *G02F 2202/023* (2013.01); *C08G 18/8175* (2013.01)
USPC .......... 428/423.1; 428/1.31; 522/174; 528/60

(58) Field of Classification Search
USPC ................ 428/1.31, 423.1; 528/60; 522/174
See application file for complete search history.

(56) References Cited

U.S. PATENT DOCUMENTS 8,754,180 B2 * 6/2014 Suda et al. .................... 526/312
2005/0221095 A1 10/2005 Miyazaki
(Continued)

FOREIGN PATENT DOCUMENTS

| CN | 1611968 | 5/2005 |
| CN | 1646637 | 7/2005 |

(Continued)

*Primary Examiner* — Thao T Tran
(74) *Attorney, Agent, or Firm* — Hamre, Schumann, Mueller & Larson, P.C.

(57) ABSTRACT

Provided is a hard coat film having high hardness and excellent restorability in view of the above circumstances. A hard coat film comprising: a light-transmitting substrate; and a hard coat layer, the hard coat layer comprising a cured product of a composition for a hard coat layer, the composition including an isocyanuric skeleton-containing urethane(meth)acrylate.

8 Claims, 1 Drawing Sheet

(51) Int. Cl.
*B29C 71/02* (2006.01)
*C08G 18/81* (2006.01)
*G02B 5/30* (2006.01)
*G02F 1/1335* (2006.01)
*C09D 4/06* (2006.01)

(56) References Cited

U.S. PATENT DOCUMENTS

2007/0292089 A1* 12/2007 Pokorny et al. ............... 385/116
2009/0252884 A1* 10/2009 Hildenbrand et al. ........ 427/508

FOREIGN PATENT DOCUMENTS

| CN | 1965041 | 5/2007 |
| JP | 2000-112379 | 4/2000 |
| JP | 2004-123780 | 4/2004 |
| JP | 2004-141732 | 5/2004 |
| JP | 2006-126808 | 5/2006 |
| JP | 2009-069429 | 4/2009 |
| JP | 4266047 B2 | 5/2009 |
| JP | 2010-107956 | 5/2010 |
| JP | 2010-111810 | 5/2010 |
| WO | 2005/103177 | 11/2005 |

* cited by examiner

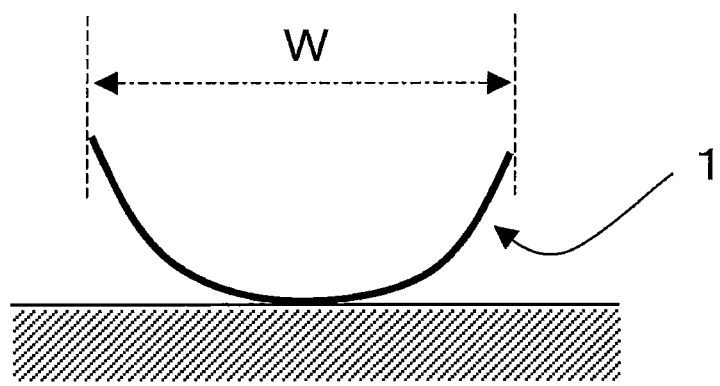

HARD COAT FILM, POLARIZER AND IMAGE DISPLAY DEVICE

TECHNICAL FIELD

The present invention relates to a hard coat film, a polarizer, and an image display device.

BACKGROUND ART

Image display devices such as cathode-ray tube (CRT) display devices, liquid crystal displays (LCDs), plasma display panels (PDPs), electroluminescence displays (ELDs), OLEDs, touch panels, electronic paper, and tablet computers are generally provided with an optical layered body for antireflection on the outermost surface. Such an antireflection optical layered body suppresses reflection of images and decreases reflectivity, by scattering light or interfering with light.

A hard coat film including a transparent substrate and a hard coat layer formed on the surface of the transparent substrate is known as an optical layered body (see Patent Literatures 1 and 2).

Such a hard coat film needs to have enough strength to be used as a product. Specifically, a hard coat film with a hardness of "H" or harder, which is determined by the pencil hardness test specified in JIS K 5600-5-4 (1999), is desirable.

Patent Literature 3 discloses, for example, a hard coated article including a hard coat layer having a thickness of 15 μm or larger and 200 μm or smaller, and a substrate. The hard coat layer is obtainable by applying a curable composition that includes a compound containing three or more ethylenically unsaturated groups and one or more isocyanurate rings within the same molecular on the substrate, and curing the curable composition.

A hard coat film is formed on the outermost surface of an image display device as described above. Therefore, a hard coat film needs to have restorability, which is an ability to restore the surface to its original flat surface when a depression is formed on the surface of a hard coat film by pencils or the like.

Particularly, a hard coat film is subjected to a pencil hardness test in order to confirm whether the film has enough hardness to be used as a product. In the pencil hardness test, a pencil may make a depression on the hard coat film. Therefore, if the hard coat film has insufficient restorability, it cannot be used as a product after the pencil hardness test.

In recent years, a hard coat film having higher hardness tends to be needed, and a hard coat film having high hardness as well as excellent restorability tends to be needed.

CITATION LIST

Patent Literature

Patent Literature 1: JP 2000-112379 A
Patent Literature 2: JP 2006-126808 A
Patent Literature 3: JP 2004-141732 A

SUMMARY OF INVENTION

Technical Problem

The present invention aims to provide a hard coat film having high hardness and excellent restorability in view of the above circumstances.

Solution to Problem

One aspect of the present invention is a hard coat film comprising: a light-transmitting substrate; and a hard coat layer, the hard coat layer comprising a cured product of a composition for a hard coat layer, the composition including an isocyanuric skeleton-containing urethane(meth)acrylate.

The isocyanuric skeleton-containing urethane(meth)acrylate is preferably an urethane acrylate obtainable by forming an isocyanurate that is a trimer of hexamethylene diisocyanate, having an isocyanuric skeleton, and reacting three terminal isocyanate groups of the isocyanurate with dipentaerythritol pentaacrylate.

The composition for a hard coat layer preferably further comprises pentaerythritol tri(meth)acrylate.

The composition for a hard coat layer according to claim 1, 2, or 3 preferably further comprises a urethane(meth)acrylate containing 6 or less functional groups.

The composition for a hard coat layer preferably further comprises a (meth)acrylic polymer.

The composition for a hard coat layer preferably further comprises a leveling agent.

Another aspect of the present invention is a polarizer comprising a polarizing element, wherein the polarizer comprises the hard coat film provided on the polarizing element surface.

Further, another aspect of the present invention is an image display device comprising the hard coat film, or the polarizer, provided on an outermost surface thereof.

The present invention will be described in detail below.

The present invention relates to a hard coat film comprising: a light-transmitting substrate; and a hard coat layer, the hard coat layer comprising a cured product of a composition for a hard coat layer, the composition including an isocyanuric skeleton-containing urethane(meth)acrylate. Therefore, the hard coat film of the present invention has high hardness and excellent restorability. The term "high hardness" specifically means the hardness of "3H" or harder determined by the pencil hardness test that is specified in JIS K 5600-5-4 (1999).

The hard coat film of the present invention includes a light-transmitting substrate and a hard coat layer.

The hard coat layer includes a cured product of a composition for a hard coat layer that includes an isocyanuric skeleton-containing urethane(meth)acrylate.

The (meth)acrylate herein includes "acrylates" and "methacrylates".

Use of an isocyanuric skeleton-containing urethane(meth)acrylate as a resin component forming the hard coat layer gives high hardness and excellent restorability to the hard coat layer.

Examples of the isocyanuric skeleton-containing urethane(meth)acrylate include an urethane(meth)acrylate obtainable by reacting an isocyanate group of an isocyanurate composed of diisocyanates with a polyfunctional monomer.

Examples of the polyfunctional monomer include pentaerythritol tri(meth)acrylate, dipentaerythritol pentaacrylate (DPPA), and dipentaerythritol tetra(meth)acrylate.

The isocyanuric skeleton-containing urethane(meth)acrylate preferably contains 9 or more functional groups. If the number of functional groups is less than 9, sufficient hardness may not be provided.

The number of functional groups is more preferably 12 or more, and still more preferably 15.

The weight average molecular weight of the isocyanuric skeleton-containing urethane(meth)acrylate is preferably 1,500 to 3,000.

If the weight average molecular weight is less than 1500, sufficient hardness may not be provided. If the weight average molecular weight exceeds 3,000, the composition for a hard coat layer becomes highly viscous to be less likely to be applied, or a curing reaction of the hard coat layer may be inhibited to provide insufficient hardness.

The weight average molecular weight is more preferably 1,800 to 2,500.

The weight average molecular weight can be measured against a polystyrene standard by gel permeation chromatography (GPC).

The isocyanuric skeleton-containing urethane(meth)acrylate is preferably a trimer of hexamethylene diisocyanate (HDI) or a trimer of isophorone diisocyanate (IPDI), and is particularly preferably an urethane acrylate obtainable by forming an isocyanurate that is a trimer of hexamethylene diisocyanate (HDI) having an isocyanuric skeleton, and reacting three terminal isocyanate groups of the isocyanurate with dipentaerythritol pentaacrylate (DPPA). Such an urethane acrylate has a large number of functional groups, a relatively high molecular weight, and an isocyanuric skeleton, and therefore provides a hard coat film with high hardness as well as elasticity, which is a characteristic owing to an urethane acrylate. Further, for example, such a hard coat film can achieve restorability that allows restoration of a depression formed on the surface of the hard coat film during a pencil hardness test.

The amount of the isocyanuric skeleton-containing urethane(meth)acrylate in a binder resin component of the composition for a hard coat layer is preferably 30 to 50% by mass on a solid basis. If the amount is less than 30% by mass, sufficient hardness or sufficient restorability may not be imparted. If the amount exceeds 50% by mass, curling and damage (wrinkles by heat) of a hard coat film may be easily caused. The amount is more preferably 35 to 50% by mass.

The "curing" of a hard coat film means curling toward a coating side due to a stress difference between the coating (hard coat layer) and the substrate which is caused by the shrinkage of the coating as a result of the curing shrinkage during an ultraviolet curing reaction in the formation of a hard coat layer.

In order to provide antiblocking properties while maintaining hardness, the composition for a hard coat layer preferably also includes a compound that contains 3 or more functional groups and an OH group in the molecule. Particularly, the composition for a hard coat layer preferably includes pentaerythritol tri(meth)acrylate. A material for providing antiblocking properties (antiblocking agent) is usually added to the composition for a hard coat layer. For greater enhancement of the effect of the antiblocking properties, the antiblocking agent is preferably concentrated at the surface of the coating. If a compound that contains (a structure containing) 3 or more functional groups and an OH group in the molecule is present in the composition for a hard coat layer, an antiblocking agent is not dispersed throughout the coating and is likely to be gathered at the surface. Therefore, the antiblocking properties are likely to be imparted and the hardness can be maintained.

That is, the composition for a hard coat layer including a compound that contains (a structure containing) 3 or more functional groups and an OH group in the molecule, preferably the composition for a hard coat layer including pentaerythritol tri(meth)acrylate, prevents blocking, namely, to prevent hard coat films from sticking to each other.

The amount of the pentaerythritol tri(meth)acrylate in a binder resin component of the composition for a hard coat layer is preferably 15 to 35% by mass on a solid basis. If the amount is less than 15% by mass, blocking may occur. If the amount exceeds 35% by mass, sufficient hardness may not be provided. The amount is more preferably 20 to 35% by mass.

The composition for a hard coat layer preferably further includes a urethane(meth)acrylate containing 6 or less functional groups.

The composition for a hard coat layer including the isocyanuric skeleton-containing urethane(meth)acrylate as well as an urethane(meth)acrylate with a relatively small number of functional groups prevents the hard coat film from curling while maintaining high pencil hardness of the hard coat film.

The urethane(meth)acrylate containing 6 or less functional groups is preferably an urethane(meth)acrylate to which a polyfunctional acrylate monomer with 2 to 3 functional groups is added, comprising hexamethylene diisocyanate (HDI) and/or isophorone diisocyanate (IPDI).

The amount of the urethane(meth)acrylate containing 6 or less functional groups in a binder resin component of the composition for a hard coat layer is preferably 15 to 35% by mass on a solid basis. If the amount is less than 15% by mass, the hard coat film may be curled. If the amount exceeds 35% by mass, sufficient hardness cannot be obtained.

The composition for a hard coat layer preferably includes a (meth)acrylic polymer in addition to the above resin component. By including the (meth)acrylic polymer, the curling and damage (wrinkles by heat) of the hard coat film can be prevented.

The "damage (wrinkles by heat)" means undulating of a hard coat layer and a substrate in the machine direction caused by their curing shrinkage. The curing shrinkage is generated by rapid heating and cooling in combination with curing shrinkage of the composition. The rapid heating is caused by an exothermic ultraviolet curing reaction in the formation of the hard coat layer. The rapid heating causes a sudden end of UV irradiation, resulting in rapid cooling.

The (meth)acrylic polymer preferably has a weight average molecular weight of 10,000 to 30,000. If the weight average molecular weight is less than 10,000, the curling may not be sufficiently prevented. If the weight average molecular weight exceeds 30,000, the film adhesion may be deteriorated or the composition for a hard coat layer may become highly viscous to cause a deteriorated coating surface. The lower limit of the weight average molecular weight is more preferably 10,000, and the upper limit thereof is more preferably 20,000.

The weight average molecular weight may be determined by gel permeation chromatography (GPC).

The (meth)acrylic polymer preferably has an acrylic double bond equivalent of 200 to 300. If the acrylic double bond equivalent is less than 200, it is difficult to synthesize the polymer and the glass transition temperature of the (meth) acrylic polymer may decrease. If the acrylic double bond equivalent exceeds 300, the amount of double bonds is small and the hardness and abrasion resistance of the resulting cured hard coat layer may be deteriorated.

The lower limit of the acrylic double bond equivalent is more preferably 210, and the upper limit thereof is more preferably 270.

The acrylic double bond equivalent is determined from the amount of double bonds which is calculated from a monomer blended and the weight average molecular weight.

The (meth)acrylic polymer preferably has the ratio of the weight average molecular weight to the acrylic double bond equivalent (weight average molecular weight/acrylic double bond equivalent) is preferably 50 to 80.

If the ratio is less than 50, the hardness and abrasion resistance may be deteriorated. If the ratio exceeds 80, the adhesion may be deteriorated.

The lower limit of the ratio is more preferably 50, and the upper limit thereof is more preferably 70.

The (meth)acrylic polymer preferably has a glass transition temperature (Tg) of 40 to 100° C. If the glass transition temperature is lower than 40° C., the hardness and the abrasion resistance may become insufficient. If the glass transition temperature exceeds 100° C., the hard coat layer may become highly viscous, or the composition may be turned into a gel. The lower limit of the glass transition temperature is more preferably 50° C., and the upper limit thereof is more preferably 70° C.

The glass transition temperature is determined by calculating the Tg of the monomer that constitutes the polymer.

The (meth)acrylic polymer preferably has an acid number of 1 mgKOH/g or smaller.

If the acid number exceeds 1 mgKOH/g, the hard coat layer having desired hardness may not be obtained. Further, the antiblocking properties may be deteriorated.

The acid number is more preferably 0.8 mgKOH/g or less.

The amount of the (meth)acrylic polymer in a binder resin component of the composition for a hard coat layer is preferably 5 to 20% by mass on a solid basis. If the amount is less than 5% by mass, the hard coat film is not prevented from curling and may be damaged (get wrinkled by heat). If the amount exceeds 20% by mass, the hardness of the hard coat layer may be deteriorated. The amount of the (meth)acrylic polymer is more preferably 10 to 20% by mass.

The composition for a hard coat layer preferably further comprises a leveling agent.

The composition for a hard coat layer containing a leveling agent can provide a hard coat layer with good flatness.

The combination use of a leveling agent with an antiblocking agent further improves antiblocking properties.

Examples of the leveling agent include known leveling agents such as fluorine leveling agents, silicone leveling agents, and acrylic leveling agents. Preferable among these are fluorine leveling agents because it requires a small amount to secure the stability of ink and the stability of a coating surface.

The amount of the leveling agent is preferably 0.1 to 1 part by mass relative to 100 parts by mass of the resin on a solid basis in the composition for a hard coat layer. If the amount is less than 0.1 parts by mass, the flatness of the coating is deteriorated, the coating is likely to have a haze or unevenness, and the antiblocking properties may not be sufficiently exhibited. If the amount exceeds 1 part by mass, the dispersibility of the composition for a hard coat layer becomes poor, a pot life of the composition for a hard coat layer is likely to be shorter, and the haze of the hard coat layer may increase due to the coagulation of an antiblocking agent or an adverse effect on the coating by an antiblocking agent.

The composition for a hard coat layer may further include an antiblocking agent.

Examples of the antiblocking agent include particles of silica and styrene, which are free from a reactive group, having an average primary particle size of 100 to 600 nm.

If the average primary particle size is smaller than 100 nm, the antiblocking properties may not be exhibited.

If the average primary particle size exceeds 600 nm, the haze may increase. The average primary particle size is more preferably 100 to 350 nm.

The average primary particle size is determined by measuring the methyl isobutyl ketone in the form of a 5% by weight dispersion using a laser diffraction scattering particle size distribution analyzer.

The amount of the antiblocking agent is preferably 0.5 to 3 parts by mass relative to 100 parts by mass of the resin on a solid basis in the composition for a hard coat layer. If the amount is less than 0.5 parts by mass, the antiblocking properties may not be exhibited. If the amount exceeds 3 parts by mass, the dispersibility is significantly deteriorated to cause coagulation and gelling, which may result in an appearance defect or an increase in haze on the surface of the hard coat film.

The composition for a hard coat layer preferably further contains a photopolymerization initiator.

The photopolymerization initiator is not particularly limited as long as it is known. Examples thereof include acetophenones (e.g. Irgacure 184 (trade name), 1-hydroxy-cyclohexyl-phenyl-ketone, product of Ciba Specialty Chemicals K.K.; Irgacure 907 (trade name), 2-methyl-1[4-(methylthio)phenyl]-2-morpholino propan-1-one, product of Ciba Specialty Chemicals K.K.), benzophenones, thioxanthones, benzoin, benzoin methyl ether, aromatic diazonium salts, aromatic sulfonium salts, aromatic iodonium salts, metallocene compounds, and benzoin sulfonate. Preferable among these are acetophenones.

The amount of the photopolymerization initiator is preferably 1 to 7 parts by mass relative to 100 parts by mass of the resin on a solid basis in the composition for a hard coat layer. If the amount is less than 1 part by mass, the insufficient amount of the photopolymerization initiator may cause insufficient curing. If the amount exceeds 7 parts by mass, too much amount of the photopolymerization initiator makes a photopolymerization reaction proceed differently, resulting in poorer hardness and resulting in defects due to the excess photopolymerization initiator.

The amount of the photopolymerization initiator is preferably 2 to 5 parts by mass relative to 100 parts by mass of the resin on a solid basis.

The composition for a hard coat layer may appropriately include other components in addition to the components described above.

Examples of other components include thermal polymerization initiators, ultraviolet absorbers, photostabilizers, crosslinking agents, curing agents, polymerization promoters, viscosity modifiers, antistatic agents, antioxidants, antifouling agents, slipping agents, refractive-index regulators, and dispersants. These are known components.

The composition for a hard coat layer may be prepared by mixing and dispersing, in a solvent, the isocyanuric skeleton-containing urethane(meth)acrylate, pentaerythritol tri(meth)acrylate, an urethane(meth)acrylate containing 6 or less functional groups, and a (meth)acrylic polymer, a leveling agent, a blocking agent, a photopolymerization initiator, and other components.

A known device such as a paint shaker, a bead mill, and a kneader may be used for the mixing and dispersing.

Examples of the solvent include alcohols (e.g. methanol, ethanol, propanol, isopropanol, n-butanol, s-butanol, t-butanol, benzyl alcohol, PGME, ethylene glycol), ketones (e.g. acetone, methyl ethyl ketone, methyl isobutyl ketone, cyclopentanone, cyclohexanone, heptanone, diisobutylketone, diethylketone), aliphatic hydrocarbons (e.g. hexane, cyclohexane), halogenated hydrocarbons (e.g. methylene chloride, chloroform, carbon tetrachloride), aromatic hydrocarbons (e.g. benzene, toluene, xylene), amides (e.g. dimethylformamide, dimethylacetamide, n-methylpyrrolidone), ethers (e.g. diethylether, dioxane, tetrahydrofran), and ether alcohols (e.g. 1-methoxy-2-propanol).

Preferable among these are methyl isobutyl ketone and/or methyl ethyl ketone because they allow to dissolve or disperse the above resin components and other additives, and the resulting composition for a hard coat layer can be suitably applied. Particularly, when triacetyl cellulose is used for the light-transmitting substrate, methyl ethyl ketone is preferable because it is permeable to the light-transmitting substrate, resulting in high adhesion between the resin components and the light-transmitting substrate and prevention of an interference fringe.

The percentage of the total solids content of the composition for a hard coat layer is preferably 30 to 45%. If the percentage is less than 30%, an excess solvent may be left or whitening may be generated. If the percentage exceeds 45%, the composition for a hard coat layer may become highly viscous and the coating property may be deteriorated to cause an unevenness, undulating, and interference fringe on the surface. The percentage of the total solids content is more preferably 35 to 45%.

The hard coat layer comprises a cured product of the composition for a hard coat layer. That is, the hard coat layer is formed by applying the composition for a hard coat layer on the light-transmitting substrate described below to make a coating, appropriately drying the coating, and curing the coating.

The coating may be formed by various known methods, such as a slit method, gravure coating method, spin coating method, dipping method, spraying method, die coating method, bar coating method, roll coater method, meniscus coater method, flexo-printing method, screen printing method, and bead coater method.

The application amount of the cured coating is preferably 5 to 15 g/m$^2$. If the application amount is less than 5 g/m$^2$, the desired hardness may not be provided. If the application amount exceeds 15 g/m$^2$, the resulting layer may be insufficiently prevented from being curled and damaged (getting wrinkled by heat). The application amount is more preferably 6 to 10 g/m$^2$.

The coating may be dried by any method, and generally dried at 30 to 120° C. for 3 to 120 seconds.

A method of curing the coating may be appropriately selected in accordance with the content or the like of the composition. For example, if the composition is ultraviolet-curable, the composition may be cured by ultraviolet irradiation to make the coating.

In this case, the ultraviolet irradiation dose is preferably 80 mJ/cm$^2$ or higher, more preferably 100 mJ/cm$^2$ or higher, and still more preferably 130 mJ/cm$^2$ or higher.

The thickness of the hard coat layer is preferably 5 to 15 μm.

If the thickness is smaller than 5 μm, desired hardness may not be provided. If the thickness exceeds 15 μm, the layer may be insufficiently prevented from being curled and damaged (getting wrinkled by heat). The lower limit of the thickness of the hard coat layer is more preferably 5 μm, and the upper limit thereof is more preferably 10 μm.

The thickness of the hard coat layer can be measured by observing the cross-section thereof using an electron microscope (SEM, TEM, STEM).

The hard coat film of the present invention comprises a light-transmitting substrate.

The light-transmitting substrate preferably has smoothness and heat resistance, and is excellent in mechanical strength.

Specific examples of materials for the light-transmitting substrate include thermoplastic resins such as polyesters (polyethylene terephthalate, polyethylene naphthalate), cellulose triacetate, cellulose diacetate, cellulose acetate butylate, polyamide, polyimide, polyethersulfone, polysulfone, polypropylene, polymethylpentene, polyvinyl chloride, polyvinyl acetal, polyether ketone, polymethyl methacrylate, polycarbonate, and polyurethane. Preferable among these are polyesters (polyethylene terephthalate, polyethylene naphthalate) and cellulose triacetate.

A film of an amorphous olefin polymer (Cyclo-Olefin-Polymer: COP) having an alicyclic structure may also be used as the light-transmitting substrate. This film is a substrate including a norbornene polymer, a monocyclic olefin polymer, a cyclic conjugated diene polymer, a vinyl alicyclic hydrocarbon polymer resin, or the like. Examples of the substrate include ZEONEX or ZEONOA (norbornene resin), product of ZEON Corporation; SUMILITE FS-1700, product of SUMITOMO BAKELITE Co., Ltd.; ARTON (modified norbornene resin), product of JSR Corporation; APEL (cyclic olefin copolymer), product of Mitsui Chemicals, Inc.; Topas (cyclic olefin copolymer), product of Ticona Inc.; and OPTOREZ OZ-1000 series (alicyclic acrylic resin), product of Hitachi Chemical Co., Ltd.). Further, FV series (low birefringence, low photoelastic coefficient film), product of Asahi Kasei Chemicals Corporation, are preferable as an alternative substrate of triacetyl cellulose.

The thermoplastic resins are preferably used in the form of a film-like body, which is rich in flexibility, as the light-transmitting substrate. Further, plates of these thermoplastic resins or a plate-like body of a glass plate may be used in accordance with a usage embodiment requiring curability.

The thickness of the light-transmitting substrate is preferably 20 to 300 μm. The upper limit is more preferably 200 μm. If the light-transmitting substrate is a plate-like body, the thickness thereof may be larger than the above thickness.

Before an anti-glare layer is formed on the light-transmitting substrate, the substrate may be subjected to physical treatment such as corona discharge treatment and oxidation treatment, or may be subjected to application of an anchor agent or a paint composition called a primer in order to improve the adhesive properties.

The hard coat film of the present invention preferably has a hardness of 3H or harder and more preferably has a hardness of 4H or harder in the pencil hardness test (load 4.9 N) in accordance with JIS K 5600-5-4(1999).

The hard coat film of the present invention preferably has a total light transmittance of 90% or higher. If the total light transmittance is less than 90% and such a hard coat film is attached on the surface of a display, the color reproducibility and visibility of the display may be deteriorated. Further, desired contrast may not be obtained. The total light transmittance is preferably 91% or higher.

The total light transmittance may be measured by the method according to JIS K 7361 using a haze meter (product of Murakami Color Research Laboratory Co., Ltd., trade no.; HM-150).

The hard coat film of the present invention preferably has a haze of 1% or less. If the haze exceeds 1%, desired optical properties are not obtained and the visibility of an image display including the hard coat film of the present invention on its surface is deteriorated.

The haze may be measured by the method according to JIS K 7136 using a haze meter (product of Murakami Color Research Laboratory Co., Ltd., trade no.; HM-150).

The hard coat film of the present invention is produced by forming the hard coat layer on the light-transmitting substrate using the composition for a hard coat layer.

The material constituting the composition for a hard coat layer and the method of forming the hard coat layer may be the same as those described in the formation of the hard coat layer.

As described above, the hard coat film of the present invention includes a hard coat layer that is formed by using a composition for a hard coat layer containing a specific resin component. Therefore, the hard coat film of the present invention has high hardness and excellent restorability.

Further, the hard coat film of the present invention may include the hard coat layer that comprises a cured product of the composition for a hard coat layer containing resin components and additives other than those described above. Such a hard coat film exhibits high hardness and excellent restorability, is prevented from being curled and damaged, and obtains excellent antiblocking properties and excellent optical properties.

Another aspect of the present invention is a polarizer comprising a polarizing element and the hard coat film of the present invention that is provided on the surface of the polarizing element by sticking the light-transmitting substrate to the surface.

Examples of the polarizing element include, but are not particularly limited to, a polyvinyl alcohol film, a polyvinyl formal film, a polyvinyl acetal film, and a saponified ethylene/vinyl acetate copolymer film, which are prepared by dyeing the films with iodine or the like and stretching the dyed films. In laminating of the polarizing element and the hard coat film of the present invention, the light-transmitting substrate is preferably subjected to saponification. The adhesive properties between the polarizing element and the hard coat film are improved by the saponification, and thus an antistatic effect can be provided.

Another aspect of the present invention is an image display device comprising the hard coat film, or the polarizer, provided on the outermost surface of the image display device. The image display device may be an LCD, a PDP, an FED, an ELD (organic EL, inorganic EL), a CRT, a touch panel, a tablet computer, electronic paper, or the like.

The LCD, which is a typical example of image display devices, includes a transmissive display and a light source device that emits light to the transmissive display from the back side. In cases where the image display device of the present invention is an LCD, the transmissive display is provided with the hard coat film of the present invention or the polarizer of the present invention on its surface.

In cases where the image display device of the present invention is a liquid crystal device having the hard coat film, a light source of a light source device emits light from the backside (substrate side) of the hard coat film. In a liquid crystal display device of an STN mode, a retardation plate may be interposed between a liquid crystal display element and a polarizer. An adhesive layer may be appropriately provided between layers of the liquid crystal display device.

The PDP includes a front side glass substrate and a back side glass substrate which is located to face the front side glass substrate, and a discharge gas is filled between these substrates. In cases where the image display device of the present invention is a PDP, the hard coat film is disposed on the surface of the front side glass substrate or a front plate (glass substrate or film substrate) thereof.

The image display device of the present invention may be an ELD device that performs display in such a way that a light emitter (e.g. zinc sulfide, diamine materials) that emits light when a voltage is applied is deposited on a glass substrate and a voltage applied to substrates is controlled, or may be a CRT that creates an image visible to the human eye by converting electric signals into light. In these cases, the hard coat film described above is provided on the outermost surface of the image display device or on the surface of a front plate of the image display device.

In any case, the hard coat film of the present invention may be used for an LCD, a PDP, an FED, an ELD (organic EL, inorganic EL), a CRT display, a touch panel display, a tablet computer display, an electronic paper display, or the like. Particularly, the hard coat film may be suitably used for the surface of a display for a high-resolution image, such as a CRT, a liquid crystal panel, a PDP, and an ELD.

Advantageous Effects of Invention

The hard coat film of the present invention has the above configuration, and therefore has high hardness and excellent restorability. Therefore, the hard coat film of the present invention may be used for an LCD, a PDP, an FED, an ELD (organic EL, inorganic EL), a CRT display, a touch panel display, a tablet computer display, an electronic paper display, or the like, and particularly suitably used for a high-resolution display.

BRIEF DESCRIPTION OF DRAWINGS

[FIG. 1]
FIG. 1 is a schematic cross sectional view showing an evaluation method of curling of a hard coat film.

DESCRIPTION OF EMBODIMENTS

The present invention is described in more detail below with reference to examples and comparative examples, but is not limited only to these examples and comparative examples.

The terms "part" and "%" herein are based on a mass, unless otherwise noted.

EXAMPLE 1

Irgacure 184 (photopolymerization initiator, product of BASF Japan Ltd.) (4 parts by mass) was dissolved in methyl ethyl ketone (MEK)/methyl isobutyl ketone (MIBK) by stirring to prepare a solution with a final solids content of 40% by mass. To the solution was added, as a resin component, pentaerythritol triacrylate (PETA); U-4HA (tetrafunctional urethane oligomer, weight average molecular weight of 600, product of Shin Nakamura Chemical Co., Ltd.); U-15HA (pentadeca functional urethane oligomer, weight average molecular weight of 2,300, product of Shin Nakamura Chemical Co., Ltd.); and an acrylic/acrylate polymer (7975-D41, acrylic double bond equivalent of 250, weight average molecular weight of 15,000, product of Hitachi Chemical Co., Ltd.), in a ratio of 25 parts by mass:25 parts by mass:40 parts by mass:10 parts by mass (in solid content). The contents were stirred. To the resulting solution was added a leveling agent (product name: Megafac F-477, product of DIC Corporation) (0.5 parts by mass on a solid basis), and the solution was stirred. Further, an antiblocking agent (1.5 parts by mass on a solid basis) (silica fine particles, particle size of 100 to 200 nm, SIRMIBK 15 WT %-E65 (solids content of 15%), product of C.I. KASEI CO., LTD) was added and stirred. Thus, a composition for a hard coat layer was prepared.

The composition for a hard coat layer was applied on a triacetyl cellulose (TAC) substrate (trade name: KC4UAW, thickness of 40 μm, product of Konica Minolta Opto Products Co., Ltd.) by slit reverse coating to prepare a coating so that the amount of the coating is 8 g/m$^2$ after curing. The resulting coating was dried for 1 minute at 70° C., and was cured by ultraviolet irradiation with a radiation dose of 130 mJ/cm$^2$ to provide a 7-μm-thick hard coat layer. Thus, a hard coat film was obtained in Example 1.

EXAMPLE 2

A hard coat film was obtained by forming a hard coat layer on a TAC substrate as in Example 1, except that, in the composition for a hard coat layer of Example 1, the ratio of the resins blended was set to (PETA:U-4HA:U-15HA: acrylic/acrylate polymer)=(25 parts by mass:15 parts by mass:50 parts by mass:10 parts by mass) (in solid content).

EXAMPLE 3

A hard coat film was obtained by forming a hard coat layer on a TAC substrate as in Example 1, except that, in the composition for a hard coat layer of Example 1, the ratio of the resins blended was set to (PETA:U-4HA:U-15HA: acrylic/acrylate polymer)=(15 parts by mass:30 parts by mass:45 parts by mass:10 parts by mass) (in solid content).

EXAMPLE 4

A hard coat film was obtained by forming a hard coat layer on a TAC substrate as in Example 1, except that, in the composition for a hard coat layer of Example 1, the ratio of the resins blended was set to (PETA:U-4HA:U-15HA: acrylic/acrylate polymer)=(20 parts by mass:20 parts by mass:40 parts by mass:20 parts by mass).

EXAMPLE 5

A hard coat film was obtained by forming a hard coat layer on a TAC substrate as in Example 1, except that, in the composition for a hard coat layer of Example 1, the ratio of the resins blended was set to (PETA:U-4HA:U-15HA: acrylic/acrylate polymer)=(30 parts by mass:20 parts by mass:40 parts by mass:10 parts by mass) (in solid content).

EXAMPLE 6

A hard coat film was obtained by forming a hard coat layer on a TAC substrate as in Example 1, except that in the composition for a hard coat layer of Example 1, the ratio of the resins blended was set to (PETA:U-4HA:U-15HA:acrylic/acrylate polymer)=(0 part by mass:0 part by mass:100 parts by mass:0 part by mass) (in solid content).

EXAMPLE 7

A hard coat film was obtained by forming a hard coat layer on a TAC substrate as in Example 1, except that, in the composition for a hard coat layer of Example 1, the ratio of the resins blended was set to (PETA:U-4HA:U-15HA: acrylic/acrylate polymer)=(12.5 parts by mass:12.5 parts by mass:62.5 parts by mass:12.5 parts by mass) (in solid content).

EXAMPLE 8

A hard coat film was obtained by forming a hard coat layer on a TAC substrate as in Example 1, except that, in the composition for a hard coat layer of Example 1, the ratio of the resins blended was set to (PETA:U-4HA:U-15HA: acrylic/acrylate polymer)=(50 parts by mass:0 part by mass: 50 parts by mass:0 part by mass) (in solid content).

EXAMPLE 9

A hard coat film was obtained by forming a hard coat layer on a TAC substrate as in Example 1, except that, in the composition for a hard coat layer of Example 1, DPHA was used instead of PETA; and the ratio of the resins blended was set to (DPHA:U-4HA:U-15HA:acrylic/acrylate polymer)= (25 parts by mass:25 parts by mass:40 parts by mass:10 parts by mass) (in solid content).

EXAMPLE 10

A hard coat film was obtained by forming a hard coat layer on a TAC substrate as in Example 1, except that, in the composition for a hard coat layer of Example 1, DPHA was used instead of PETA; and the ratio of the resins blended was set to (DPHA:U-4HA:U-15HA:acrylic/acrylate polymer)= (10 parts by mass:30 parts by mass:45 parts by mass:15 parts by mass) (in solid content).

EXAMPLE 11

A hard coat film was obtained by forming a hard coat layer on a TAC substrate as in Example 1, except that, in the composition for a hard coat layer of Example 1, DPHA was used instead of PETA; and the ratio of the resins blended was set to (DPHA:U-4HA:U-15HA:acrylic/acrylate polymer)= (40 parts by mass:20 parts by mass:35 parts by mass:5 parts by mass) (in solid content).

EXAMPLE 12

A hard coat film was obtained by forming a hard coat layer on a TAC substrate as in Example 1, except that, in the composition for a hard coat layer of Example 1, the ratio of the resins blended was set to (PETA:U-4HA:U-15HA: acrylic/acrylate polymer)=(0 part by mass:0 part by mass:50 parts by mass:50 parts by mass) (in solid content).

EXAMPLE 13

A hard coat film was obtained by forming a hard coat layer on a TAC substrate as in Example 1, except that, in the composition for a hard coat layer of Example 1, the ratio of the resins blended was set to (PETA:U-4HA:U-15HA: acrylic/acrylate polymer)=(0 part by mass:50 parts by mass: 50 parts by mass:0 part by mass) (in solid content).

EXAMPLE 14

A hard coat film was obtained by forming a hard coat layer on a TAC substrate as in Example 1, except that, in the composition for a hard coat layer of Example 1, the ratio of the resins blended was set to (PETA:U-4HA:U-15HA: acrylic/acrylate polymer)=(62.5 parts by mass:12.5 parts by mass:12.5 parts by mass:12.5 parts by mass) (in solid content).

EXAMPLE 15

A hard coat film was obtained by forming a hard coat layer on a TAC substrate as in Example 1, except that, in the composition for a hard coat layer of Example 1, the ratio of the resins blended was set to (PETA:U-4HA:U-15HA: acrylic/acrylate polymer)=(25 parts by mass:25 parts by mass:25 parts by mass:25 parts by mass) (in solid content).

Comparative Example 1

A hard coat film was obtained by forming a hard coat layer on a TAC substrate as in Example 1, except that, in the composition for a hard coat layer of Example 1, the ratio of the resins blended was set to (PETA:U-4HA:U-15HA:acrylic/acrylate polymer)=(0 part by mass:100 parts by mass:0 part by mass:0 part by mass) (in solid content).

Comparative Example 2

A hard coat film was obtained by forming a hard coat layer on a TAC substrate as in Example 1, except that, in the composition for a hard coat layer of Example 1, the ratio of the resins blended was set to (PETA:U-4HA:U-15HA:acrylic/acrylate polymer)=(50 parts by mass:50 parts by mass:0 part by mass:0 part by mass) (in solid content).

Comparative Example 3

A hard coat film was obtained by forming a hard coat layer on a TAC substrate as in Example 1, except that, in the composition for a hard coat layer of Example 1, the ratio of the resins blended was set to (PETA:U-4HA:U-15HA:acrylic/acrylate polymer)=(100 parts by mass:0 part by mass:0 part by mass:0 part by mass) (in solid content).

Comparative Example 4

A hard coat film was obtained by forming a hard coat layer on a TAC substrate as in Example 1, except that, in the composition for a hard coat layer of Example 1, the ratio of the resins blended was set to (PETA:U-4HA:U-15HA:acrylic/acrylate polymer)=(0 part by mass:0 part by mass:0 part by mass:100 parts by mass) (in solid content).

Comparative Example 5

A hard coat film was obtained by forming a hard coat layer on a TAC substrate as in Example 1, except that, in the composition for a hard coat layer of Example 1, the ratio of the resins blended was set to (PETA:U-4HA:U-15HA:acrylic/acrylate polymer)=(50 parts by mass:0 part by mass:0 part by mass:50 parts by mass) (in solid content).

Comparative Example 6

A hard coat film was obtained by forming a hard coat layer on a TAC substrate as in Example 1, except that, in the composition for a hard coat layer of Example 1, the ratio of the resins blended was set to (PETA:U-4HA:U-15HA:acrylic/acrylate polymer)=(0 part by mass:50 parts by mass:0 part by mass:50 parts by mass) (in solid content).

Comparative Example 7

A hard coat film was obtained by forming a hard coat layer on a TAC substrate as in Example 1, except that, in the composition for a hard coat layer of Example 1, BS-577 (IPDI skeleton, product of Arakawa Chemical Industries, Ltd.) was used instead of U-4HA and U-15HA, which are an urethane acrylate; and the ratio of the resins blended was set to (PETA:BS-577:acrylic/acrylate polymer)=(70 parts by mass:20 parts by mass:10 parts by mass) (in solid content).

Reference Example 1

A hard coat film was obtained by forming a hard coat layer on a TAC substrate as in Example 1, except that, in the composition for a hard coat layer of Example 1, FA-731A (trifunctional urethane oligomer, weight average molecular weight of 450, product of Hitachi Chemical Co., Ltd.) was used instead of U-15HA, which is an urethane acrylate; and the ratio of the resins blended was set to (PETA:U-4HA:FA-731A:acrylic/acrylate polymer)=(25 parts by mass:25 parts by mass:40 parts by mass:10 parts by mass). FA-731A was a trifunctional acrylate containing an isocyanuric skeleton, and therefore, sufficient hard coat properties were not provided.

The respective hard coat films were evaluated for the following items. Table 1 shows the evaluation results.

<Pencil Hardness Test>

The respective hard coat films were conditioned at a temperature of 25° C. and a relative humidity of 60% for 2 hours. Subsequently, the pencil hardness of the surface of the hard coat film on which the hard coat layer was formed was measured using test pencils (hardness HB to 3H) specified in JIS S 6006 at a load of 4.9 N in accordance with a pencil hardness evaluation method specified in JIS K 5600-5-4 (1999). A film with a pencil hardness of 3H or harder is evaluated as having good hard coat properties and a film with a pencil hardness of 2H or softer is evaluated as having no hard coat properties.

<Restorability>

The above pencil hardness test was performed to make three or more scratch lines (including a depression) on the respective hard coat films, and the films were allowed to stand in an oven at 100° C. for 10 minutes. After the heating, the restorability was evaluated based on the following criteria.
Good: Two or more scratch lines were restored after heating.
Acceptable: One scratch line was restored after heating.
Poor: No scratch line was restored.

<Antiblocking Property>

Two samples of each hard coat film were prepared and rubbed against each other. The slidability therebetween was evaluated based on the following criteria.
Excellent: Well slidable against each other
Good: Slidable against each other
Acceptable: Slightly slidable against each other
Poor: Not slidable against each other <Curl>

The resulting hard coat film was cut into a square of 10 cm×10 cm, and placed with its coating surface facing upward. The width (W) of the curled film was measured as shown in FIG. 1 and the degree of the curl was evaluated based on the following criteria.
Good: The width of the curled film was 50 mm or larger.
Fairly Good The width of the curled film was 10 mm or larger and smaller than 50 mm.
Acceptable: The width of the curled film was smaller than 10 mm.
Poor: A film has no width and is cylindrically curled up.

<Damage (Wrinkle by Heat)>

The degree of the generation of damage (wrinkle by heat) along the running direction of the substrate caused by UV irradiation curing for the formation of the hard coat layer was observed under a fluorescent light, and was evaluated based on the following criteria.
Good: There is almost no wrinkle by heat.
Acceptable: Although there is a wrinkle by heat, it is substantially not a problem.
Poor: There is a meandering wrinkle by heat.

<Adhesion>

The adhesion of the resulting hard coat film was determined by a cross-cut grid test. The ratio of the number of film squares remaining on a substrate after tape was removed from the grid to the initial number of film squares was calculated. The resulting ratio was evaluated based on the following criteria.

Good: 90/100 to 100/100
Acceptable: 50/100 to 89/100
Poor: 0/100 to 49/100

TABLE 1

|  | Pencil hardness | Restorability | Antiblocking property | Curl | Damage | Adhesion |
|---|---|---|---|---|---|---|
| Example 1 | 3H | Good | Excellent | Good | Good | Good |
| Example 2 | 3H | Good | Excellent | Fairly Good | Good | Good |
| Example 3 | 3H | Good | Good | Good | Good | Good |
| Example 4 | 3H | Good | Excellent | Good | Good | Good |
| Example 5 | 3H | Good | Excellent | Good | Good | Good |
| Example 6 | 3H | Good | Poor | Poor | Poor | Good |
| Example 7 | 3H | Good | Acceptable | Fairly Good | Poor | Good |
| Example 8 | 3H | Good | Excellent | Poor | Poor | Good |
| Example 9 | 3H | Good | Poor | Acceptable | Acceptable | Good |
| Example 10 | 3H | Good | Poor | Fairly Good | Acceptable | Good |
| Example 11 | 3H | Good | Poor | Poor | Poor | Good |
| Example 12 | 3H | Good | Poor | Good | Good | Acceptable |
| Example 13 | 3H | Good | Poor | Acceptable | Acceptable | Good |
| Example 14 | 3H | Acceptable | Excellent | Good | Acceptable | Good |
| Example 15 | 3H | Good | Excellent | Good | Good | Good |
| Comparative Example 1 | 2H | Good | Poor | Fairly Good | Acceptable | Good |
| Comparative Example 2 | 2H | Acceptable | Excellent | Acceptable | Acceptable | Good |
| Comparative Example 3 | 2H | Poor | Excellent | Poor | Poor | Good |
| Comparative Example 4 | H | Acceptable | Poor | Good | Good | Poor |
| Comparative Example 5 | H | Poor | Excellent | Good | Good | Good |
| Comparative Example 6 | H | Acceptable | Poor | Good | Good | Acceptable |
| Comparative Example 7 | 2H | Poor | Excellent | Acceptable | Poor | Good |
| Reference Example 1 | 2H | Acceptable | Excellent | Good | Good | Good |

Table 1 shows that the hard coat films of the examples have pencil hardness of 3H or harder in the pencil hardness test. In addition to the high pencil hardness, some of the hard coat films have good antiblocking properties, good restorability, or good adhesion; or are well prevented from being curled and damaged (getting wrinkled by heat). On the other hand, the hard coat films of the comparative examples have pencil hardness of softer than 3H.

Example 1: All items are good. Particularly, the antiblocking properties are very good. This is because the appropriate amount of PETA is blended.

Example 2: The pencil hardness and restorability are good. The antiblocking properties are evaluated the same as in Example 1. The curl is "Fairly Good" because the amount of U-4HA is small.

Example 3: The pencil hardness and restorability are good. The antiblocking properties are "Good" because the amount of PETA is small.

Example 4: All items are good. Particularly, the antiblocking properties are very good. This is because the appropriate amount of PETA is blended.

Example 5: All items are good. Particularly, the antiblocking properties are very good. This is because the appropriate amount of PETA is blended.

Example 6: The pencil hardness and restorability are good. The antiblocking properties, curl, and damage (wrinkle by heat) are "Poor" because only U-15HA is used.

Example 7: The pencil hardness and restorability are good. The antiblocking properties are "Acceptable" because the amount of U-15HA is large and the amount of PETA is small. The curl is "Fairly Good" and the damage (wrinkle by heat) is "Poor" because the amount of U-4HA is small.

Example 8: The pencil hardness and restorability are good. Particularly, the antiblocking properties are very good because the amount of PETA is large. The curl and damage (wrinkle by heat) are "Poor" because no U-4HA and no acrylic/acrylate polymer are included.

Example 9: The pencil hardness and restorability are good. The antiblocking properties are "Poor" because no PETA is used. The hardness is good, but the curl and damage (wrinkle by heat) are "Acceptable", because DPHA is used.

Example 10: The pencil hardness and restorability are good. The antiblocking properties are "Poor" because no PETA was used. The hardness is good, but the curl is "Fairly Good" and the damage (wrinkle by heat) is "Acceptable", because DPHA is used.

Example 11: The pencil hardness and restorability are good. The antiblocking properties are "Poor" and the curl and damage (wrinkle by heat) are also "Poor" because the amount of DPHA is increased.

Example 12: The pencil hardness and restorability are good. The hardness is maintained because U-15HA is included, but the antiblocking properties are "Poor" because no PETA is used. The adhesion is "Acceptable" because the amount of the acrylic/acrylate polymer is large, which leads to poor adhesion of the film to a light-transmitting substrate.

Example 13: The pencil hardness and restorability are good. The hardness is maintained because U-15HA is included, but the antiblocking properties are "Poor" because no PETA is used. The curl and damage (wrinkle by heat) are "Acceptable" because the amount of U-4HA is large.

Example 14: The pencil hardness is good. Particularly, the antiblocking properties are very good because the amount of PETA is large, but the restorability is "Acceptable" and the damage (wrinkle by heat) is also "Acceptable".

Example 15: All items are good. Particularly, the antiblocking properties are very good. This is because the appropriate amount of PETA is blended.

Comparative Example 1: The pencil hardness is 2H because only U-15HA is included. The antiblocking properties are "Poor", the curl is "Fairly Good", and the damage (wrinkle by heat) is "Acceptable".

Comparative Example 2: The pencil hardness is 2H because PETA and U-4HA are included. The antiblocking properties are good, but the restorability is "Acceptable" and the curl and damage (wrinkle by heat) are also "Acceptable".

Comparative, Example 3: The pencil hardness is 2H because only PETA is included. The restorability is "Poor" and the curl and damage (wrinkle by heat) are also "Poor", but the antiblocking properties are good.

Comparative Example 4: The pencil hardness and the restorability are deteriorated and the antiblocking properties and the adhesion are "Poor" because only an acrylic/acrylate polymer is included, but the curl and damage (wrinkle by heat) are good.

Comparative Example 5: The pencil hardness is deteriorated and the restorability is "Poor" because PETA and an acrylic/acrylate polymer are included, but the antiblocking properties, the curl and damage (wrinkle by heat) are good.

Comparative Example 6: The pencil hardness is H and the restorability is "Acceptable" because U-4HA and an acrylic/acrylate polymer are included. The antiblocking properties are "Poor" and the adhesion is "Acceptable" because no PETA is included.

Comparative Example 7: The antiblocking properties are good because the amount of PETA is large, but the pencil hardness is 2H and the restorability is insufficiently obtained because an urethane acrylate composed of IPDI is used. Further, the curl is "Acceptable" and the damage (wrinkle by heat) is "Poor".

Reference Example 1: A trifunctional monomer containing an isocyanuric skeleton is used, but the hardness is insufficient to be 2H because of the small number of functional groups insufficiently.

INDUSTRIAL APPLICABILITY

The hard coat film of the present invention can be suitably used for a display of a cathode-ray tube (CRT) display device, a liquid crystal display (LCD), a plasma display panel (PDP), an electroluminescence display (ELD), an OLED, a touch panel display, an electronic paper display, a tablet computer display, and the like.

EXPLANATION OF SYMBOLS

1 Hard-coat film

The invention claimed is:

1. A hard coat film comprising:
a light-transmitting substrate; and
a hard coat layer,
wherein the hard coat layer comprises a cured product of a composition for a hard coat layer, the composition comprising an isocyanuric skeleton-containing urethane (meth)acrylate,
wherein the isocyanuric skeleton-containing urethane (meth)acrylate is urethane acrylate obtained by reacting three terminal isocyanate groups of an isocyanurate, which is a trimer of hexamethylene diisocyanate and has an isocyanuric skeleton, with a polyfunctional monomer so as to form the isocyanuric skeleton-containing urethane(meth)acrylate, and
wherein the isocyanuric skeleton-containing urethane (meth)acrylate contains 9 or more functional groups.

2. The hard coat film according to claim 1,
wherein the polyfunctional monomer is dipentaerythritol pentaacrylate.

3. The hard coat film according to claim 1,
wherein the composition for a hard coat layer further comprises pentaerythritol tri(meth)acrylate.

4. The hard coat film according to claim 1,
wherein the composition for a hard coat layer further comprises a urethane(meth)acrylate containing six or less functional groups.

5. The hard coat film according to claim 1,
wherein the composition for a hard coat layer further comprises a (meth)acrylic polymer.

6. The hard coat film according to claim 1,
wherein the composition for a hard coat layer further comprises a leveling agent.

7. A polarizer comprising a polarizing element,
wherein the polarizer further comprises the hard coat film according to claim 1, the hard coat film being provided on the polarizing element surface.

8. An image display device comprising
the hard coat film according to claim 1, or a polarizer comprising a polarizing element,
wherein the polarizer comprises the hard coat film according to claim 1 that is formed on a surface of the polarizing element, and
wherein the hard coat film or the polarizer is provided on an outermost surface of the image display device.

* * * * *